E. VELTUNG.
RESILIENT TIRE CONSTRUCTION.
APPLICATION FILED MAR. 11, 1920.
1,373,370.
Patented Mar. 29, 1921.
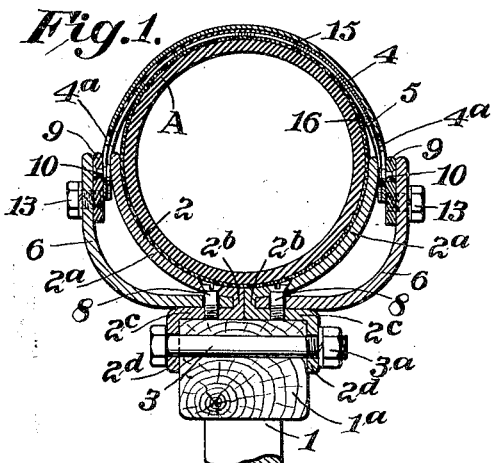
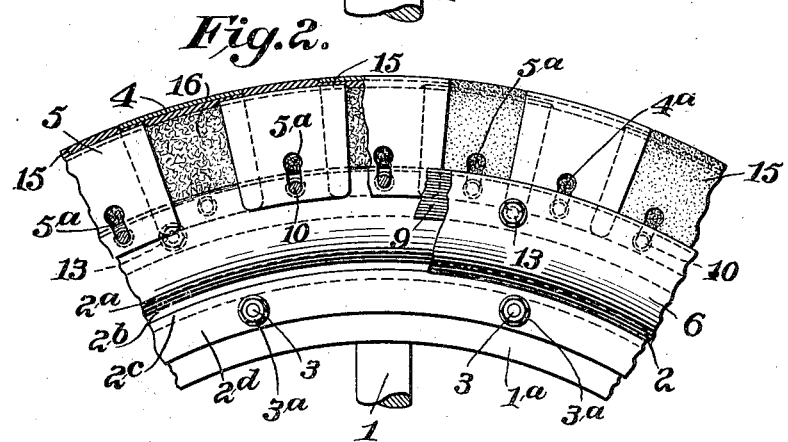
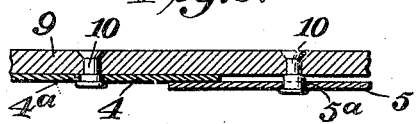
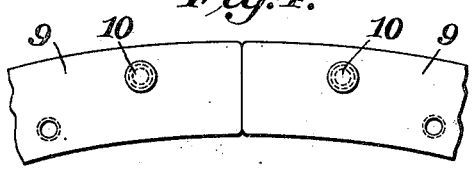
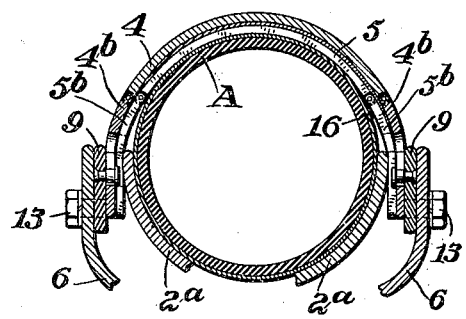
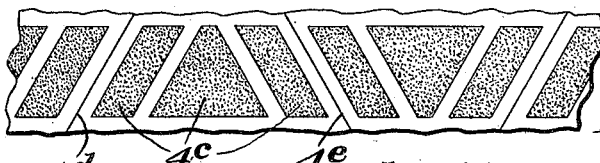
Inventor:
Ernest Veltung,
by Spear Middleton Donaldson & Hall
Attys.

UNITED STATES PATENT OFFICE.

ERNEST VELTUNG, OF NEW YORK, N. Y., ASSIGNOR TO VELTUNG STEEL TIRE COMPANY, A CORPORATION OF DELAWARE.

RESILIENT-TIRE CONSTRUCTION.

1,373,370.

Specification of Letters Patent.

Patented Mar. 29, 1921.

Application filed March 11, 1920. Serial No. 364,981.

*To all whom it may concern:*

Be it known that I, ERNEST VELTUNG, a citizen of the United States, and a resident of New York, in the county and State of New York, have invented certain new and useful Improvements in Resilient-Tire Construction, of which the following is a specification.

My present invention relates to improvements in resilient tire constructions for vehicle wheels, and aims to provide a simple, economical and durable construction which will be non-puncturable and free from rim cutting troubles so frequently experienced with pneumatic tires now in common use.

A further object is to provide a construction which in case of deflation may be run temporarily without removal of the tire from the rim and without danger of injuring the tire.

A further object is to provide a construction which will be self sealing against the entrance of moisture and dirt, thereby preventing rusting and rendering the parts less liable to wear.

I have further aimed to provide an arrangement by which a single tube may be used, thus avoiding the necessity for the double tube type of tire heretofore almost exclusively used.

Still another object is to provide a construction which may be readily applied to and removed from the wheel rim.

With these and other objects in view the invention includes the novel features of construction and arrangement and combination of parts hereinafter described and particularly defined by the appended claim.

An embodiment of my invention is illustrated in the accompanying drawings in which—

Figure 1 is a transverse section through a wheel rim with my improved tire applied thereto.

Fig. 2 is a side elevation of a portion of the tire and rim, partly broken away.

Figs. 3 and 4 are detail views.

Fig. 5 is a sectional view of a modified form and Fig. 6 is a view of a modified form of tread broken away at the sides.

Referring by reference characters to this drawing the numeral 1 designates a vehicle wheel to which my improved tire construction is shown as applied, and which may be of the ordinary or any desired construction, save that the felly $1^a$ is provided with a plain cylindrical periphery and with transverse bolt holes for the passage of the securing bolts hereinafter described.

Detachably secured to this felly $1^a$ is an annular tire seating or carrying portion 2 formed of two sections which are practically duplicates of each other. Each comprises a part $2^a$ which has an inner face curved to conform to the surface of the inflatable tube and of an extent to overlie approximately one quarter of the surface of the tube, the two sections, when placed upon the rim and in juxtaposition as shown, providing an annular channel approximately semi-circular in cross section. The two sections are further provided with inwardly extending portions $2^b$, at the bases of which are located outwardly turned flanges $2^c$, the inner faces of which rest upon the outer periphery of the felly.

My preferred manner of securing the tire seat upon the felly is to provide the margins of the flanges $2^c$ with inwardly extended annular flanges $2^d$ which embrace the felly between them and to which they are secured by bolts 3 passing through alining openings in the flanges and felly.

The bolts are preferably passed through from the inside of the wheel, and while both sections may be readily removed from the felly as a matter of fact, after installation, it is practically never necessary to remove more than the outer section which can be readily and quickly done by unscrewing the nuts $3^a$ and slipping off the corresponding section, leaving the other section and bolts in place.

Within the annular tire seating channel formed by the two sections above described is placed an annular inflatable member which is preferably in the shape of an endless tube A of hose material, to wit fabric and rubber, or of the character of the single tube tires.

To protect this against puncture and the wear of the road I provide a protecting armor comprising a plurality of strips of resilient metal indicated at 4 and 5, which are arranged to take the wear of the road and are normally sustained by the pressure of the tube A, but can yield inwardly by reason of their inherent resiliency and also by reason of their ends being arranged to have radial sliding movement toward and from the axis of the wheel.

A manner of slidingly connecting said ends which I have found desirable is to provide annular side members 6 which have their inner horizontal edge portions inserted in the channels formed between the parts $2^a$ and $2^c$, being held therein by screws 8 inserted through alining openings in the parts and tapped into the parts $2^c$. The screws are, of course, inserted before the air tube is seated in position, and the heads of the screws are countersunk as shown.

After the tire seat sections 2 and members 6 have been applied the resilient tread members are applied. To enable them to be easily and quickly placed in position, and held firmly in use, I provide on each side of the tire a sectional carrying and securing ring 9. These rings are preferably each of two semi-circular segments which, when assembled, form a complete ring, and are provided with studs or rivets 10 which project through radial slots $4^a$ and $5^a$ in the plates 4 and 5, being headed on the inside to overlap the edges of the slots as shown in Fig. 3.

To enable the resilient members to be individually disconnected from the rings in case of wear or breakage the slots may have enlarged portions as shown, sufficient to permit the passage of the heads of the studs, or said studs might be made removable from the rings.

After the tread members are connected to the pairs of segments 9 the latter are inserted from opposite sides of the wheel between the portions $2^a$ and 6 and are secured by locking screws or screw bolts 13 inserted in alining openings in the parts, the ends of the segments abutting and forming complete rings.

To prevent moisture and dirt from working in between the tread members I prefer to arrange them in two series, the members being arranged in staggered and overlapping relation, the outer series 4 overlapping the inner series 5, and to provide between these a sealing layer of rubber as indicated at 15.

In assembling, the outer members 4 would first be placed in position with their slots engaging the studs; the rubber sealing layer would then be placed in position, and thereafter the inner set of members 5 would be secured in place, confining and compressing the rubber between the two sets and sealing the peripheral surface.

Instead of making the resilient members integral throughout their entire extent I may make them of sections hinged together as shown in Fig. 5, each having a main resilient portion overlying the tread, and side wings or portions hinged to the main portion as indicated at $4^b$ and $5^b$.

To make the tread non-slipping I may recess the outer faces of the resilient members and fill such recesses with suitable anti-slipping material such for example as carborundum, as indicated at $4^c$ in Fig. 6. In this form I have shown how instead of using two series of overlapping tread members I may use a single layer of abutting tread members in which event I prefer to have them abut on abutting lines inclined alternately in opposite directions as indicated at $4^d$ and $4^e$.

If desired, a layer or sheath of asbestos or like material, 16, may be placed around the tube A to prevent rust action or damage thereto.

Having described my invention, what I claim is:

In a resilient tire, a channel shaped rim, an inflatable tube seated therein, sectional rings located on opposite sides of said rim with means for detachably securing them thereto, resilient tread members overlying said inflatable tube and having their ends lying within said sectional rings, said resilient members having radial slots in their end portions, and studs projecting inwardly from the rings and engaging the slots, said studs having heads on the inside of the resilient members and said slots enlarged portions to permit the passage of the heads.

In testimony whereof I affix my signature.

ERNEST VELTUNG.